US011165656B2

(12) United States Patent
Mermoud et al.

(10) Patent No.: US 11,165,656 B2
(45) Date of Patent: *Nov. 2, 2021

(54) PRIVACY-AWARE MODEL GENERATION FOR HYBRID MACHINE LEARNING SYSTEMS

(71) Applicant: Cisco Technology, Inc., San Jose, CA (US)

(72) Inventors: Grégory Mermoud, Veyras (CH); Jean-Philippe Vasseur, Saint Martin D'uriage (FR); Andrea Di Pietro, Lausanne (CH); Erwan Barry Tarik Zerhouni, Zürich (CH)

(73) Assignee: Cisco Technology, Inc., San Jose, CA (US)

( * ) Notice: Subject to any disclaimer, the term of this patent is extended or adjusted under 35 U.S.C. 154(b) by 64 days.

This patent is subject to a terminal disclaimer.

(21) Appl. No.: 16/697,344

(22) Filed: Nov. 27, 2019

(65) Prior Publication Data

US 2020/0099590 A1 Mar. 26, 2020

Related U.S. Application Data

(63) Continuation of application No. 15/996,645, filed on Jun. 4, 2018, now Pat. No. 10,536,344.

(51) Int. Cl.
*H04L 12/24* (2006.01)
*G06F 21/62* (2013.01)
(Continued)

(52) U.S. Cl.
CPC ........ *H04L 41/145* (2013.01); *G06F 21/6245* (2013.01); *G06N 20/00* (2019.01);
(Continued)

(58) Field of Classification Search
CPC ....... H04L 41/145; H04L 41/16; H04L 41/28; H04L 43/04; H04L 63/1425;
(Continued)

(56) References Cited

U.S. PATENT DOCUMENTS 9,729,571 B1 * 8/2017 Ferguson .............. H04L 63/306
10,320,569 B1 6/2019 Wentz et al.
(Continued)

OTHER PUBLICATIONS

Das, et al., "Privacy-aware contextual localization using network traffic analysis", Computer Networks 118, pp. 24-36, 2017, Elsevier B.V.

*Primary Examiner* — Muhammad Raza
(74) *Attorney, Agent, or Firm* — Behmke Innovation Group LLC; James M. Behmke; Jonathon P. Western

(57) ABSTRACT

In one embodiment, a network assurance service executing in a local network clusters measurements obtained from the local network regarding a plurality of devices in the local network into measurement clusters. The network assurance service computes aggregated metrics for each of the measurement clusters. The network assurance service sends a machine learning model computation request to a remote service outside of the local network that includes the aggregated metrics for each of the measurement clusters. The remote service uses the aggregated metrics to train a machine learning-based model to analyze the local network. The network assurance service receives the trained machine learning-based model to analyze performance of the local network. The network assurance service uses the receive machine learning-based model to analyze performance of the local network.

15 Claims, 7 Drawing Sheets

(51) Int. Cl.
*H04L 12/26* (2006.01)
*G06N 20/00* (2019.01)

(52) U.S. Cl.
CPC .............. *H04L 41/16* (2013.01); *H04L 41/28* (2013.01); *H04L 43/04* (2013.01)

(58) Field of Classification Search
CPC . H04L 63/1416; G06N 20/00; G06F 21/6245; G06F 17/30598; G06F 17/30958
See application file for complete search history.

(56) References Cited

U.S. PATENT DOCUMENTS

| | | |
|---|---|---|
| 2015/0193697 A1* | 7/2015 | Vasseur ............... H04L 43/0876 706/12 |
| 2016/0021126 A1 | 1/2016 | Vasseur et al. |
| 2016/0028753 A1 | 1/2016 | Di Pietro et al. |
| 2016/0359697 A1 | 12/2016 | Scheib et al. |
| 2017/0063909 A1 | 3/2017 | Muddu et al. |
| 2017/0149639 A1 | 5/2017 | Vasseur et al. |
| 2018/0018590 A1* | 1/2018 | Szeto .................. G06F 21/6254 |
| 2018/0165475 A1 | 6/2018 | Veeramachaneni et al. |
| 2018/0197111 A1 | 7/2018 | Crabtree et al. |
| 2018/0248905 A1* | 8/2018 | Cote ....................... G06F 17/18 |
| 2018/0249406 A1 | 8/2018 | Tellado et al. |
| 2018/0255023 A1* | 9/2018 | Whaley .................. G06N 20/00 |
| 2019/0132422 A1 | 5/2019 | Garcia Duran et al. |
| 2019/0155682 A1 | 5/2019 | Sinha et al. |
| 2019/0182120 A1 | 6/2019 | Coccia et al. |
| 2019/0238516 A1 | 8/2019 | Weggenmann et al. |
| 2019/0244138 A1* | 8/2019 | Bhowmick ............. H04L 9/008 |
| 2019/0318268 A1* | 10/2019 | Wang ..................... G06N 20/00 |
| 2019/0332814 A1* | 10/2019 | Bos ....................... H04L 9/3247 |
| 2019/0349266 A1* | 11/2019 | Johnsson ............ H04L 41/0893 |
| 2021/0027182 A1* | 1/2021 | Harris .................... G06N 99/00 |

\* cited by examiner

PRIVACY-AWARE MODEL GENERATION FOR HYBRID MACHINE LEARNING SYSTEMS

RELATED APPLICATION

The application is a continuation application of U.S. patent application Ser. No. 15/996,645, filed on Jun. 4, 2018, entitled PRIVACY-AWARE MODEL GENERATION FOR HYBRID MACHINE LEARNING SYSTEMS, by Mermoud, et al, the contents of which are incorporated herein by reference.

TECHNICAL FIELD

The present disclosure relates generally to computer networks, and, more particularly, to privacy-aware model generation for hybrid machine learning systems.

BACKGROUND

Networks are large-scale distributed systems governed by complex dynamics and very large number of parameters. In general, network assurance involves applying analytics to captured network information, to assess the health of the network. For example, a network assurance system may track and assess metrics such as available bandwidth, packet loss, jitter, and the like, to ensure that the experiences of users of the network are not impinged. However, as networks continue to evolve, so too will the number of applications present in a given network, as well as the number of metrics available from the network.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1A:
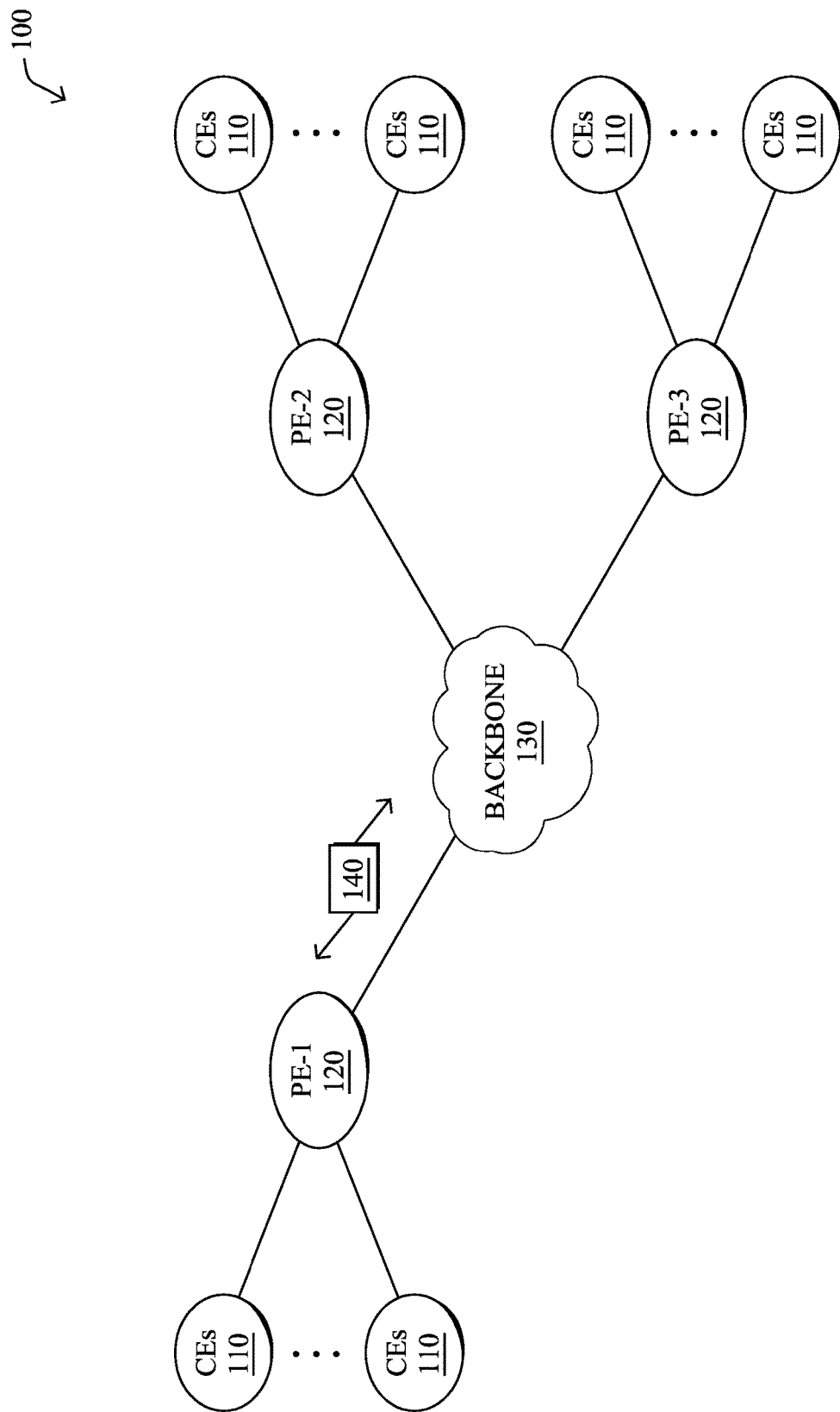
FIGS. 1A-1B illustrate an example communication network.

According to one or more embodiments of the disclosure, a network assurance service executing in a local network clusters measurements obtained from the local network regarding a plurality of devices in the local network into measurement clusters. The network assurance service computes aggregated metrics for each of the measurement clusters. The network assurance service sends a machine learning model computation request to a remote service outside of the local network that includes the aggregated metrics for each of the measurement clusters. The remote service uses the aggregated metrics to train a machine learning-based model to analyze the local network. The network assurance service receives the trained machine learning-based model to analyze performance of the local network. The network assurance service uses the receive machine learning-based model to analyze performance of the local network.

In further embodiments, a remote service receives a machine learning model computation request from a network assurance service executing in a local network. The request includes aggregated metrics for clusters of measurements obtained by the network assurance service from the local network regarding a plurality of devices in the local network. The remote service forms a synthetic training dataset for the model by combining the aggregated metrics from the model computation request with measurements associated with devices in one or more other networks. The remote service trains the machine learning-based model using the synthetic training dataset. The remote service sends the trained machine learning-based model to the network assurance service. The network assurance service uses the model to analyze performance of the local network.

Description

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links, or Powerline Communications (PLC) such as IEEE 61334, IEEE P1901.2, and others. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

FIG. 1A is a schematic block diagram of an example computer network 100 illustratively comprising nodes/devices, such as a plurality of routers/devices interconnected by links or networks, as shown. For example, customer edge (CE) routers 110 may be interconnected with provider edge (PE) routers 120 (e.g., PE-1, PE-2, and PE-3) in order to communicate across a core network, such as an illustrative network backbone 130. For example, routers 110, 120 may be interconnected by the public Internet, a multiprotocol label switching (MPLS) virtual private network (VPN), or the like. Data packets 140 (e.g., traffic/messages) may be exchanged among the nodes/devices of the computer network 100 over links using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router or a set of routers may be connected to a private network (e.g., dedicated leased lines, an optical network, etc.) or a virtual private network (VPN), such as an MPLS VPN thanks to a carrier network, via one or more links exhibiting very different network and service level agreement characteristics. For the sake of illustration, a given customer site may fall under any of the following categories:

1.) Site Type A: a site connected to the network (e.g., via a private or VPN link) using a single CE router and a single link, with potentially a backup link (e.g., a 3G/4G/LTE backup connection). For example, a particular CE router 110 shown in network 100 may support a given customer site, potentially also with a backup link, such as a wireless connection.

2.) Site Type B: a site connected to the network using two MPLS VPN links (e.g., from different Service Providers), with potentially a backup link (e.g., a 3G/4G/LTE connection). A site of type B may itself be of different types:

2a.) Site Type B1: a site connected to the network using two MPLS VPN links (e.g., from different Service Providers), with potentially a backup link (e.g., a 3G/4G/LTE connection).

2b.) Site Type B2: a site connected to the network using one MPLS VPN link and one link connected to the public Internet, with potentially a backup link (e.g., a 3G/4G/LTE connection). For example, a particular customer site may be connected to network 100 via PE-3 and via a separate Internet connection, potentially also with a wireless backup link.

2c.) Site Type B3: a site connected to the network using two links connected to the public Internet, with potentially a backup link (e.g., a 3G/4G/LTE connection).

Notably, MPLS VPN links are usually tied to a committed service level agreement, whereas Internet links may either have no service level agreement at all or a loose service level agreement (e.g., a "Gold Package" Internet service connection that guarantees a certain level of performance to a customer site).

3.) Site Type C: a site of type B (e.g., types B1, B2 or B3) but with more than one CE router (e.g., a first CE router connected to one link while a second CE router is connected to the other link), and potentially a backup link (e.g., a wireless 3G/4G/LTE backup link). For example, a particular customer site may include a first CE router 110 connected to PE-2 and a second CE router 110 connected to PE-3.

Figure 1B:
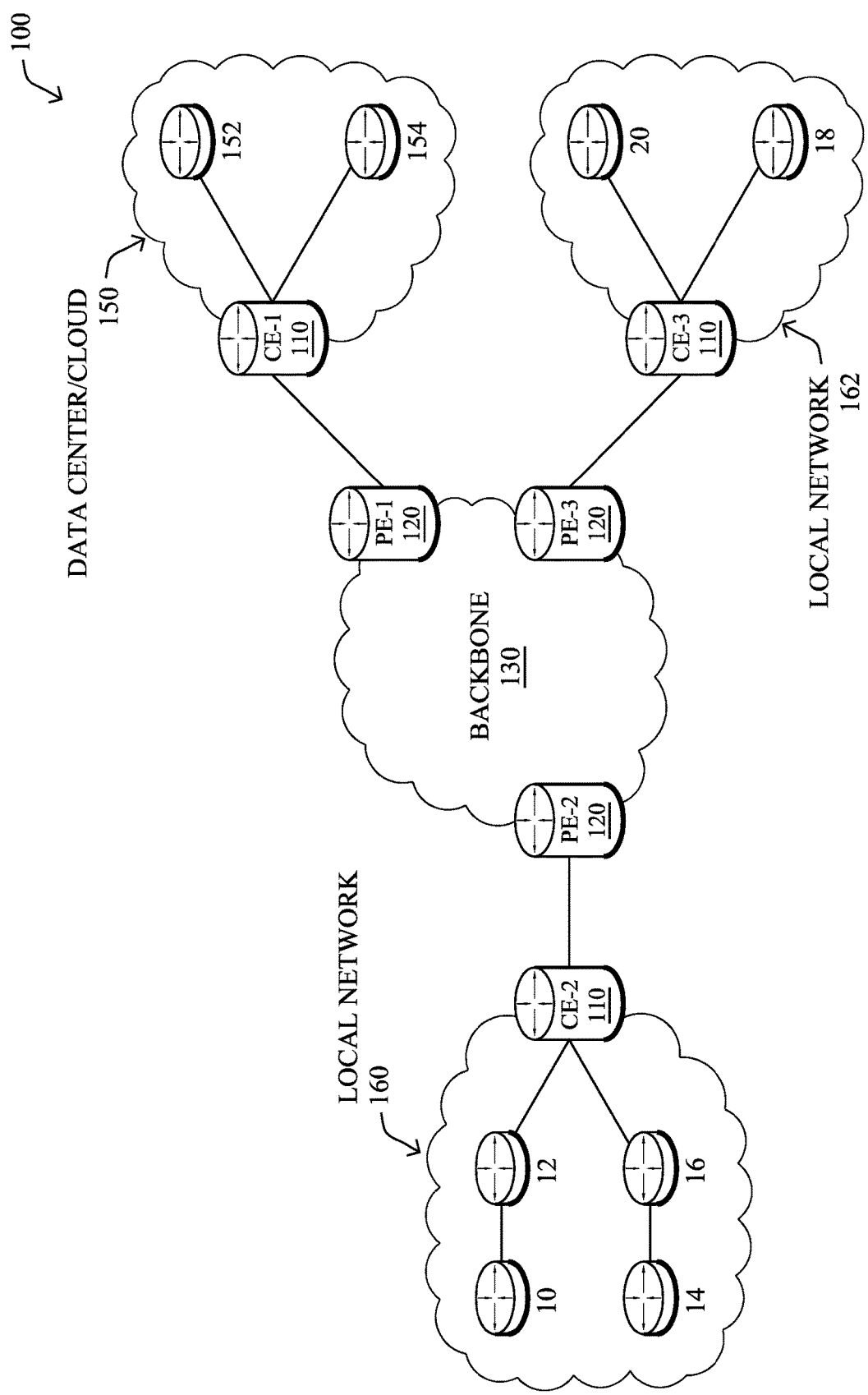

FIG. 1B illustrates an example of network 100 in greater detail, according to various embodiments. As shown, network backbone 130 may provide connectivity between devices located in different geographical areas and/or different types of local networks. For example, network 100 may comprise local/branch networks 160, 162 that include devices/nodes 10-16 and devices/nodes 18-20, respectively, as well as a data center/cloud environment 150 that includes servers 152-154. Notably, local networks 160-162 and data center/cloud environment 150 may be located in different geographic locations.

Servers 152-154 may include, in various embodiments, a network management server (NMS), a dynamic host configuration protocol (DHCP) server, a constrained application protocol (CoAP) server, an outage management system (OMS), an application policy infrastructure controller (APIC), an application server, etc. As would be appreciated, network 100 may include any number of local networks, data centers, cloud environments, devices/nodes, servers, etc.

In some embodiments, the techniques herein may be applied to other network topologies and configurations. For example, the techniques herein may be applied to peering points with high-speed links, data centers, etc.

In various embodiments, network 100 may include one or more mesh networks, such as an Internet of Things network. Loosely, the term "Internet of Things" or "IoT" refers to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, heating, ventilating, and air-conditioning (HVAC), windows and window shades and blinds, doors, locks, etc. The "Internet of Things" thus generally refers to the interconnection of objects (e.g., smart objects), such as sensors and actuators, over a computer network (e.g., via IP), which may be the public Internet or a private network.

Notably, shared-media mesh networks, such as wireless or PLC networks, etc., are often on what is referred to as Low-Power and Lossy Networks (LLNs), which are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen to thousands or even millions of LLN routers, and support point-to-point traffic (between devices inside the LLN), point-to-multipoint traffic (from a central control point such as the root node to a subset of devices inside the LLN), and multipoint-to-point traffic (from devices inside the LLN towards a central control point). Often, an IoT network is implemented with an LLN-like architecture. For example, as shown, local network 160 may be an LLN in which CE-2 operates as a root node for nodes/devices 10-16 in the local mesh, in some embodiments.

In contrast to traditional networks, LLNs face a number of communication challenges. First, LLNs communicate over a physical medium that is strongly affected by environmental conditions that change over time. Some examples include temporal changes in interference (e.g., other wireless networks or electrical appliances), physical obstructions (e.g., doors opening/closing, seasonal changes such as the foliage density of trees, etc.), and propagation characteristics of the physical media (e.g., temperature or humidity changes, etc.). The time scales of such temporal changes can range between milliseconds (e.g., transmissions from other transceivers) to months (e.g., seasonal changes of an outdoor environment). In addition, LLN devices typically use low-cost and low-power designs that limit the capabilities of their transceivers. In particular, LLN transceivers typically provide low throughput. Furthermore, LLN transceivers typically support limited link margin, making the effects of interference and environmental changes visible to link and network protocols. The high number of nodes in LLNs in comparison to traditional networks also makes routing, quality of service (QoS), security, network management, and traffic engineering extremely challenging, to mention a few.

Figure 2:
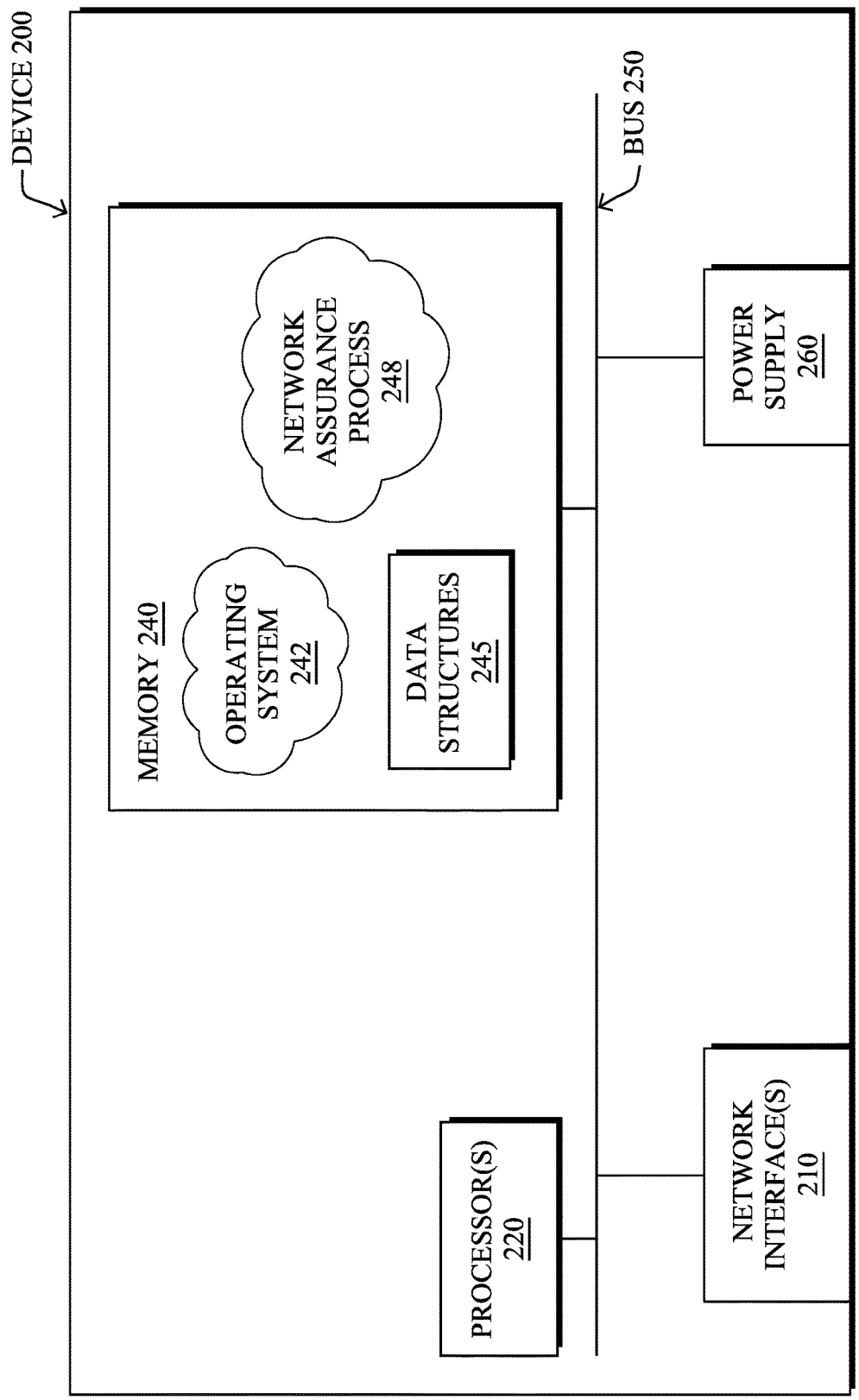
FIG. 2 illustrates an example network device/node.

FIG. 2 is a schematic block diagram of an example node/device 200 that may be used with one or more embodiments described herein, e.g., as any of the computing devices shown in FIGS. 1A-1B, particularly the PE routers 120, CE routers 110, nodes/device 10-20, servers 152-154 (e.g., a network controller located in a data center, etc.), any other computing device that supports the operations of network 100 (e.g., switches, etc.), or any of the other devices referenced below. The device 200 may also be any other suitable type of device depending upon the type of network architecture in place, such as IoT nodes, etc. Device 200 comprises one or more network interfaces 210, one or more processors 220, and a memory 240 interconnected by a system bus 250, and is powered by a power supply 260.

The network interfaces 210 include the mechanical, electrical, and signaling circuitry for communicating data over physical links coupled to the network 100. The network interfaces may be configured to transmit and/or receive data using a variety of different communication protocols. Notably, a physical network interface 210 may also be used to implement one or more virtual network interfaces, such as for virtual private network (VPN) access, known to those skilled in the art.

The memory 240 comprises a plurality of storage locations that are addressable by the processor(s) 220 and the network interfaces 210 for storing software programs and data structures associated with the embodiments described herein. The processor 220 may comprise necessary elements or logic adapted to execute the software programs and manipulate the data structures 245. An operating system 242 (e.g., the Internetworking Operating System, or IOS®, of Cisco Systems, Inc., another operating system, etc.), portions of which are typically resident in memory 240 and executed by the processor(s), functionally organizes the node by, inter alia, invoking network operations in support of software processors and/or services executing on the device. These software processors and/or services may comprise a network assurance process 248, as described herein, any of which may alternatively be located within individual network interfaces.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

Network assurance process 248 includes computer executable instructions that, when executed by processor(s) 220, cause device 200 to perform network assurance functions as part of a network assurance infrastructure within the network. In general, network assurance refers to the branch of networking concerned with ensuring that the network provides an acceptable level of quality in terms of the user experience. For example, in the case of a user participating in a videoconference, the infrastructure may enforce one or more network policies regarding the videoconference traffic, as well as monitor the state of the network, to ensure that the user does not perceive potential issues in the network (e.g., the video seen by the user freezes, the audio output drops, etc.).

In some embodiments, network assurance process 248 may use any number of predefined health status rules, to enforce policies and to monitor the health of the network, in view of the observed conditions of the network. For example, one rule may be related to maintaining the service usage peak on a weekly and/or daily basis and specify that if the monitored usage variable exceeds more than 10% of the per day peak from the current week AND more than 10% of the last four weekly peaks, an insight alert should be triggered and sent to a user interface.

Another example of a health status rule may involve client transition events in a wireless network. In such cases, whenever there is a failure in any of the transition events, the wireless controller may send a reason_code to the assurance system. To evaluate a rule regarding these conditions, the network assurance system may then group 150 failures into different "buckets" (e.g., Association, Authentication, Mobility, DHCP, WebAuth, Configuration, Infra, Delete, De-Authorization) and continue to increment these counters per service set identifier (SSID), while performing averaging every five minutes and hourly. The system may also maintain a client association request count per SSID every five minutes and hourly, as well. To trigger the rule, the system may evaluate whether the error count in any bucket has exceeded 20% of the total client association request count for one hour.

In various embodiments, network assurance process 248 may also utilize machine learning techniques, to enforce policies and to monitor the health of the network. In general, machine learning is concerned with the design and the development of techniques that take as input empirical data (such as network statistics and performance indicators), and recognize complex patterns in these data. One very common pattern among machine learning techniques is the use of an underlying model M, whose parameters are optimized for minimizing the cost function associated to M, given the input data. For instance, in the context of classification, the model M may be a straight line that separates the data into two classes (e.g., labels) such that M=a*x+b*y+c and the cost function would be the number of misclassified points. The learning process then operates by adjusting the parameters a, b, c such that the number of misclassified points is minimal. After this optimization phase (or learning phase), the model M can be used very easily to classify new data points. Often, M is a statistical model, and the cost function is inversely proportional to the likelihood of M, given the input data.

In various embodiments, network assurance process 248 may employ one or more supervised, unsupervised, or semi-supervised machine learning models. Generally, supervised learning entails the use of a training set of data, as noted above, that is used to train the model to apply labels to the input data. For example, the training data may include sample network observations that do, or do not, violate a given network health status rule and are labeled as such. On the other end of the spectrum are unsupervised techniques that do not require a training set of labels. Notably, while a supervised learning model may look for previously seen patterns that have been labeled as such, an unsupervised model may instead look to whether there are sudden changes in the behavior. Semi-supervised learning models take a middle ground approach that uses a greatly reduced set of labeled training data.

Example machine learning techniques that network assurance process 248 can employ may include, but are not limited to, nearest neighbor (NN) techniques (e.g., k-NN models, replicator NN models, etc.), statistical techniques (e.g., Bayesian networks, etc.), clustering techniques (e.g., k-means, mean-shift, etc.), neural networks (e.g., reservoir networks, artificial neural networks, etc.), support vector machines (SVMs), logistic or other regression, Markov models or chains, principal component analysis (PCA) (e.g., for linear models), multi-layer perceptron (MLP) ANNs (e.g., for non-linear models), replicating reservoir networks (e.g., for non-linear models, typically for time series), random forest classification, or the like.

The performance of a machine learning model can be evaluated in a number of ways based on the number of true positives, false positives, true negatives, and/or false negatives of the model. For example, the false positives of the model may refer to the number of times the model incorrectly predicted poor performance in the network or the presence of an anomalous condition. Conversely, the false negatives of the model may refer to the number of times the model predicted good performance when, in fact, poor performance occurred. True negatives and positives may refer to the number of times the model correctly predicted whether the performance was good or poor, respectively. Related to these measurements are the concepts of recall and precision. Generally, recall refers to the ratio of true positives to the sum of true positives and false negatives, which quantifies the sensitivity of the model. Similarly, precision refers to the ratio of true positives the sum of true and false positives.

Figure 3:
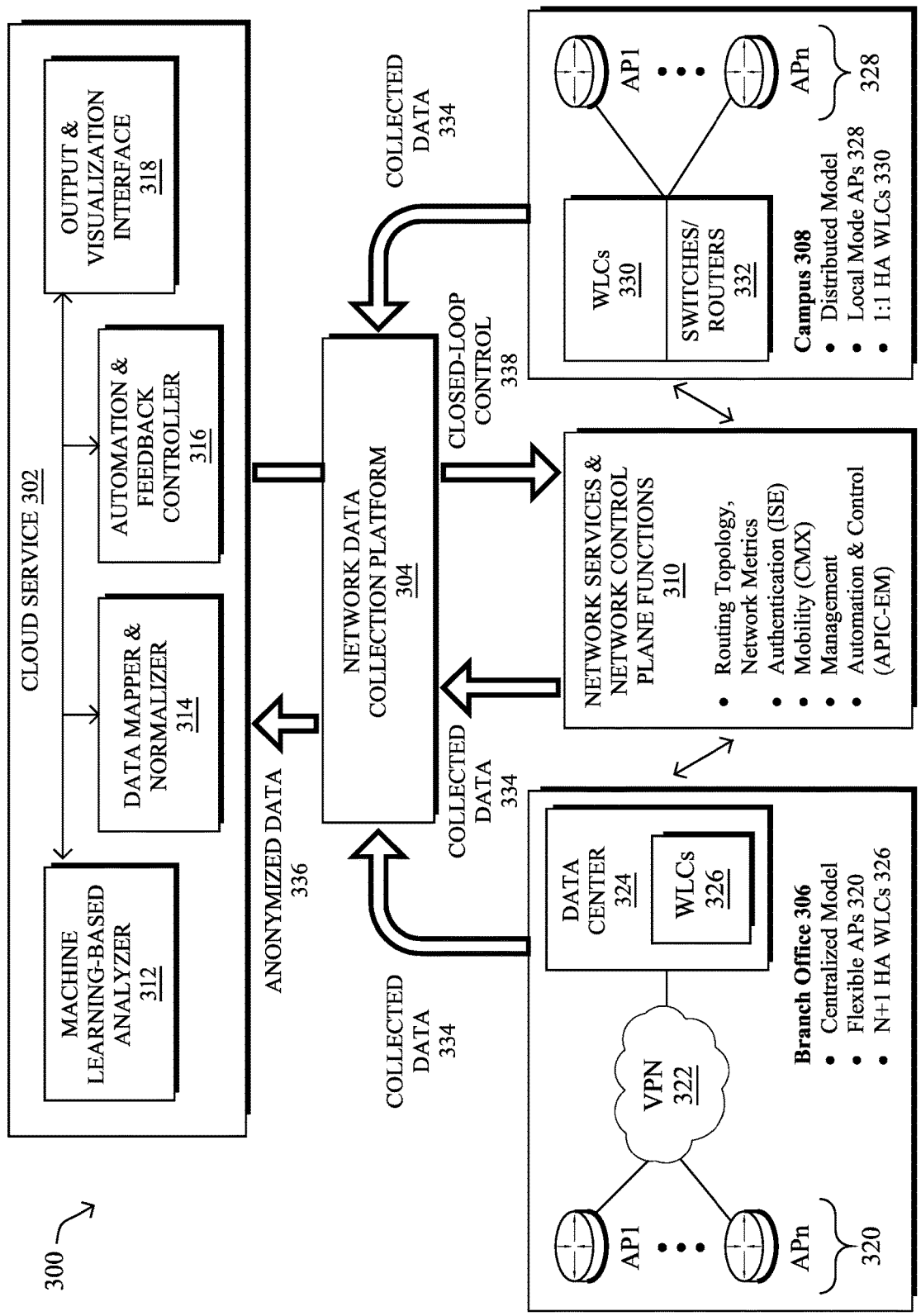
FIG. 3 illustrates an example network assurance system.

FIG. 3 illustrates an example network assurance system 300, according to various embodiments. As shown, at the core of network assurance system 300 may be a cloud service 302 that leverages machine learning in support of cognitive analytics for the network, predictive analytics (e.g., models used to predict user experience, etc.), troubleshooting with root cause analysis, and/or trending analysis for capacity planning. Generally, architecture 300 may support both wireless and wired network, as well as LLNs/IoT networks.

In various embodiments, cloud service 302 may oversee the operations of the network of an entity (e.g., a company, school, etc.) that includes any number of local networks. For example, cloud service 302 may oversee the operations of the local networks of any number of branch offices (e.g., branch office 306) and/or campuses (e.g., campus 308) that may be associated with the entity. Data collection from the various local networks/locations may be performed by a network data collection platform 304 that communicates with both cloud service 302 and the monitored network of the entity.

The network of branch office 306 may include any number of wireless access points 320 (e.g., a first access point AP1 through nth access point, APn) through which endpoint nodes may connect. Access points 320 may, in turn, be in communication with any number of wireless LAN controllers (WLCs) 326 (e.g., supervisory devices that provide control over APs) located in a centralized datacenter 324. For example, access points 320 may communicate with WLCs 326 via a VPN 322 and network data collection platform 304 may, in turn, communicate with the devices in datacenter 324 to retrieve the corresponding network feature data from access points 320, WLCs 326, etc. In such a centralized model, access points 320 may be flexible access points and WLCs 326 may be N+1 high availability (HA) WLCs, by way of example.

Conversely, the local network of campus 308 may instead use any number of access points 328 (e.g., a first access point AP1 through nth access point APm) that provide connectivity to endpoint nodes, in a decentralized manner. Notably, instead of maintaining a centralized datacenter, access points 328 may instead be connected to distributed WLCs 330 and switches/routers 332. For example, WLCs 330 may be 1:1 HA WLCs and access points 328 may be local mode access points, in some implementations.

To support the operations of the network, there may be any number of network services and control plane functions 310. For example, functions 310 may include routing topology and network metric collection functions such as, but not limited to, routing protocol exchanges, path computations, monitoring services (e.g., NetFlow or IPFIX exporters), etc. Further examples of functions 310 may include authentication functions, such as by an Identity Services Engine (ISE) or the like, mobility functions such as by a Connected Mobile Experiences (CMX) function or the like, management functions, and/or automation and control functions such as by an APIC-Enterprise Manager (APIC-EM).

During operation, network data collection platform 304 may receive a variety of data feeds that convey collected data 334 from the devices of branch office 306 and campus 308, as well as from network services and network control plane functions 310. Example data feeds may comprise, but are not limited to, management information bases (MIBS) with Simple Network Management Protocol (SNMP)v2, JavaScript Object Notation (JSON) Files (e.g., WSA wireless, etc.), NetFlow/IPFIX records, logs reporting in order to collect rich datasets related to network control planes (e.g., Wi-Fi roaming, join and authentication, routing, QoS, PHY/MAC counters, links/node failures), traffic characteristics, and other such telemetry data regarding the monitored network. As would be appreciated, network data collection platform 304 may receive collected data 334 on a push and/or pull basis, as desired. Network data collection platform 304 may prepare and store the collected data 334 for processing by cloud service 302. In some cases, network data collection platform may also anonymize collected data 334 before providing the anonymized data 336 to cloud service 302.

In some cases, cloud service 302 may include a data mapper and normalizer 314 that receives the collected and/or anonymized data 336 from network data collection platform 304. In turn, data mapper and normalizer 314 may map and normalize the received data into a unified data model for further processing by cloud service 302. For example, data mapper and normalizer 314 may extract certain data features from data 336 for input and analysis by cloud service 302.

In various embodiments, cloud service 302 may include a machine learning (ML)-based analyzer 312 configured to analyze the mapped and normalized data from data mapper and normalizer 314. Generally, analyzer 312 may comprise a power machine learning-based engine that is able to understand the dynamics of the monitored network, as well as to predict behaviors and user experiences, thereby allowing cloud service 302 to identify and remediate potential network issues before they happen.

Machine learning-based analyzer 312 may include any number of machine learning models to perform the techniques herein, such as for cognitive analytics, predictive analysis, and/or trending analytics as follows:

Cognitive Analytics Model(s): The aim of cognitive analytics is to find behavioral patterns in complex and unstructured datasets. For the sake of illustration, analyzer 312 may be able to extract patterns of Wi-Fi roaming in the network and roaming behaviors (e.g., the "stickiness" of clients to APs 320, 328, "ping-pong" clients, the number of visited APs 320, 328, roaming triggers, etc). Analyzer 312 may characterize such patterns by the nature of the device (e.g., device type, OS) according to the place in the network, time of day, routing topology, type of AP/WLC, etc., and potentially correlated with other network metrics (e.g., application, QoS, etc.). In another example, the cognitive analytics model(s) may be configured to extract AP/WLC related patterns such as the number of clients, traffic throughput as a function of time, number of roaming processed, or the like, or even end-device related patterns (e.g., roaming patterns of iPhones, IoT Healthcare devices, etc.).

Predictive Analytics Model(s): These model(s) may be configured to predict user experiences, which is a significant paradigm shift from reactive approaches to network health. For example, in a Wi-Fi network, analyzer 312 may be configured to build predictive models for the joining/roaming time by taking into account a large plurality of parameters/observations (e.g., RF variables, time of day, number of clients, traffic load, DHCP/DNS/Radius time, AP/WLC loads, etc.). From this, analyzer 312 can detect potential network issues before they happen. Furthermore, should abnormal joining time be predicted by analyzer 312, cloud service 312 will be able to identify the major root cause of this predicted condition, thus allowing cloud service 302 to remedy the situation before it occurs. The predictive analytics model(s) of analyzer 312 may also be able to predict other metrics such as the expected throughput for a client using a specific application. In yet another example, the predictive analytics model(s) may predict the user experience for voice/video quality using network variables (e.g., a predicted user rating of 1-5 stars for a given session, etc.), as function of the network state. As would be appreciated, this approach may be far superior to traditional approaches that rely on a mean opinion score (MOS). In contrast, cloud service 302 may use the predicted user experiences from analyzer 312 to provide information to a network administrator or architect in real-time and enable closed loop control over the network by cloud service 302, accordingly. For example, cloud service 302 may signal to a particular type of endpoint node in branch office 306 or campus 308 (e.g., an iPhone, an IoT healthcare device, etc.) that better QoS will be achieved if the device switches to a different AP 320 or 328.

Trending Analytics Model(s): The trending analytics model(s) may include multivariate models that can predict future states of the network, thus separating noise from actual network trends. Such predictions can be used, for example, for purposes of capacity planning and other "what-if" scenarios.

Machine learning-based analyzer 312 may be specifically tailored for use cases in which machine learning is the only viable approach due to the high dimensionality of the dataset and patterns cannot otherwise be understood and learned. For example, finding a pattern so as to predict the actual user experience of a video call, while taking into account the nature of the application, video CODEC parameters, the states of the network (e.g., data rate, RF, etc.), the current observed load on the network, destination being reached, etc., is simply impossible using predefined rules in a rule-based system.

Unfortunately, there is no one-size-fits-all machine learning methodology that is capable of solving all, or even most, use cases. In the field of machine learning, this is referred to as the "No Free Lunch" theorem. Accordingly, analyzer 312 may rely on a set of machine learning processes that work in conjunction with one another and, when assembled, operate as a multi-layered kernel. This allows network assurance system 300 to operate in real-time and constantly learn and adapt to new network conditions and traffic characteristics. In other words, not only can system 300 compute complex patterns in highly dimensional spaces for prediction or behavioral analysis, but system 300 may constantly evolve according to the captured data/observations from the network.

Cloud service 302 may also include output and visualization interface 318 configured to provide sensory data to a network administrator or other user via one or more user interface devices (e.g., an electronic display, a keypad, a speaker, etc.). For example, interface 318 may present data indicative of the state of the monitored network, current or predicted issues in the network (e.g., the violation of a defined rule, etc.), insights or suggestions regarding a given condition or issue in the network, etc. Cloud service 302 may also receive input parameters from the user via interface 318 that control the operation of system 300 and/or the monitored network itself. For example, interface 318 may receive an instruction or other indication to adjust/retrain one of the models of analyzer 312 from interface 318 (e.g., the user deems an alert/rule violation as a false positive).

In various embodiments, cloud service 302 may further include an automation and feedback controller 316 that provides closed-loop control instructions 338 back to the various devices in the monitored network. For example, based on the predictions by analyzer 312, the evaluation of any predefined health status rules by cloud service 302, and/or input from an administrator or other user via input 318, controller 316 may instruct an endpoint client device, networking device in branch office 306 or campus 308, or a network service or control plane function 310, to adjust its operations (e.g., by signaling an endpoint to use a particular AP 320 or 328, etc.).

As noted above, a key feature of network assurance cloud service 302 is its ability to leverage large datasets of measurements from a broad range of networks and across multiple organizations (e.g., businesses, schools, government entities, etc.). Doing so allows service 302 to tailor the machine learning models in its machine learning-based analyzer 312 to each network and/or organization. In other words, locating machine learning-based analyzer 312 in the cloud allows service 302 to:

Leverage both the network measurements for the specific organization under scrutiny, as well as measurements from any number of other networks or organizations, to train more accurate machine learning-based models in analyzer 312 for that organization. In other words, a cloud-based approach allows service 302 to apply cross-learning to the datasets from different networks or organizations.

Leverage the vast computational resources of the cloud, to accommodate for bursts in the computation requirements involved in model training.

Despite the benefits of a cloud-based network assurance service, there are certain situations in which a given network cannot use a cloud-based solution. For example, confidentiality requirements of the network may prevent data regarding the network to be sent to the cloud for analysis. In another example, it may not be practical to send the network measurements to the cloud for analysis, such as due to technical constraints. Thus, in some embodiments, some or all of network assurance service 300 shown in FIG. 3 may be implemented completely on premise so that little or no customer data is transmitted externally to the cloud.

In the case of an on-premise implementation of a network assurance service, a local agent may process telemetry data generated by the network using a pre-installed machine learning-based model. Since the telemetry data is not available to the cloud engine, and the on-premise agent typically does not have enough computational resources to train such a model using the local telemetry data, the pre-installed model may be computed in the cloud based on similar datasets and pushed to the local network for execution. This approach, however, has two important drawbacks:

The capability of the cloud computed model to accurately reflect the behavior of the local network depends on how statistically similar the datasets available to the cloud are to the local telemetry data.

Depending on the nature of the chosen model (e.g., the type of input features, temporal granularity, etc.) the computational resource requirements of the model evaluation can change dramatically. For example, some input features may require CPU-intensive computations, temporal features may require a large memory buffer, etc.

A hybrid approach to model training and deployment in a network assurance system is also possible. As opposed to sharing all on-premise telemetry data with the cloud-based service, or sharing none of the data at all, a hybrid approach can also be taken whereby only a limited amount of the telemetry data is reported. For example, it may be acceptable in certain situations to share a limited amount of telemetry data, especially if the data is property anonymized. Indeed, a key limitation of the no-sharing approach is that the model pushed from the cloud for on-premise execution is often suboptimal in terms of performance, even if optimized for a specific vertical and/or type of network. Even if multiple candidate models are pushed to the on-premise instance, the likelihood to have a "good fit" is not a given, and may vary greatly, given the humongous size of the model space.

Privacy-Aware Model Generation for Hybrid Machine Learning Systems

The techniques herein introduce a privacy-aware technique to generate machine learning models in a hybrid system. In some aspects, the techniques herein allow an on-premise instance of a network assurance service to share an anonymized and differentially private summary of its underlying dataset with a cloud-based instance. Using this summary, components of the cloud-based service can train custom machine learning models for deployment to, and execution by, the on-premise instance of the network assurance service. In other words, the techniques herein allow for a two-way exchange between the on-premise instance and the cloud, but with very restrictive constrains in terms of the types and sensitivities of the data that can be shared. Furthermore, differential privacy can be used to provide strong anonymization guarantees for the shared data. By sharing at least a portion of the telemetry data from the local network with the cloud, according to these privacy constraints, the techniques herein allow for greater modeling performance without sacrificing the privacy of end users and network operators.

Specifically, according to one or more embodiments of the disclosure as described in detail below, a network assurance service executing in a local network clusters measurements obtained from the local network regarding a plurality of devices in the local network into measurement clusters. The network assurance service computes aggregated metrics for each of the measurement clusters. The network assurance service sends a machine learning model computation request to a remote service outside of the local network that includes the aggregated metrics for each of the measurement clusters. The remote service uses the aggregated metrics to train a machine learning-based model to analyze the local network. The network assurance service receives the trained machine learning-based model to analyze performance of the local network. The network assurance service uses the receive machine learning-based model to analyze performance of the local network.

Illustratively, the techniques described herein may be performed by hardware, software, and/or firmware, such as in accordance with the network assurance process 248, which may include computer executable instructions executed by the processor 220 (or independent processor of interfaces 210) to perform functions relating to the techniques described herein.

Figure 4:
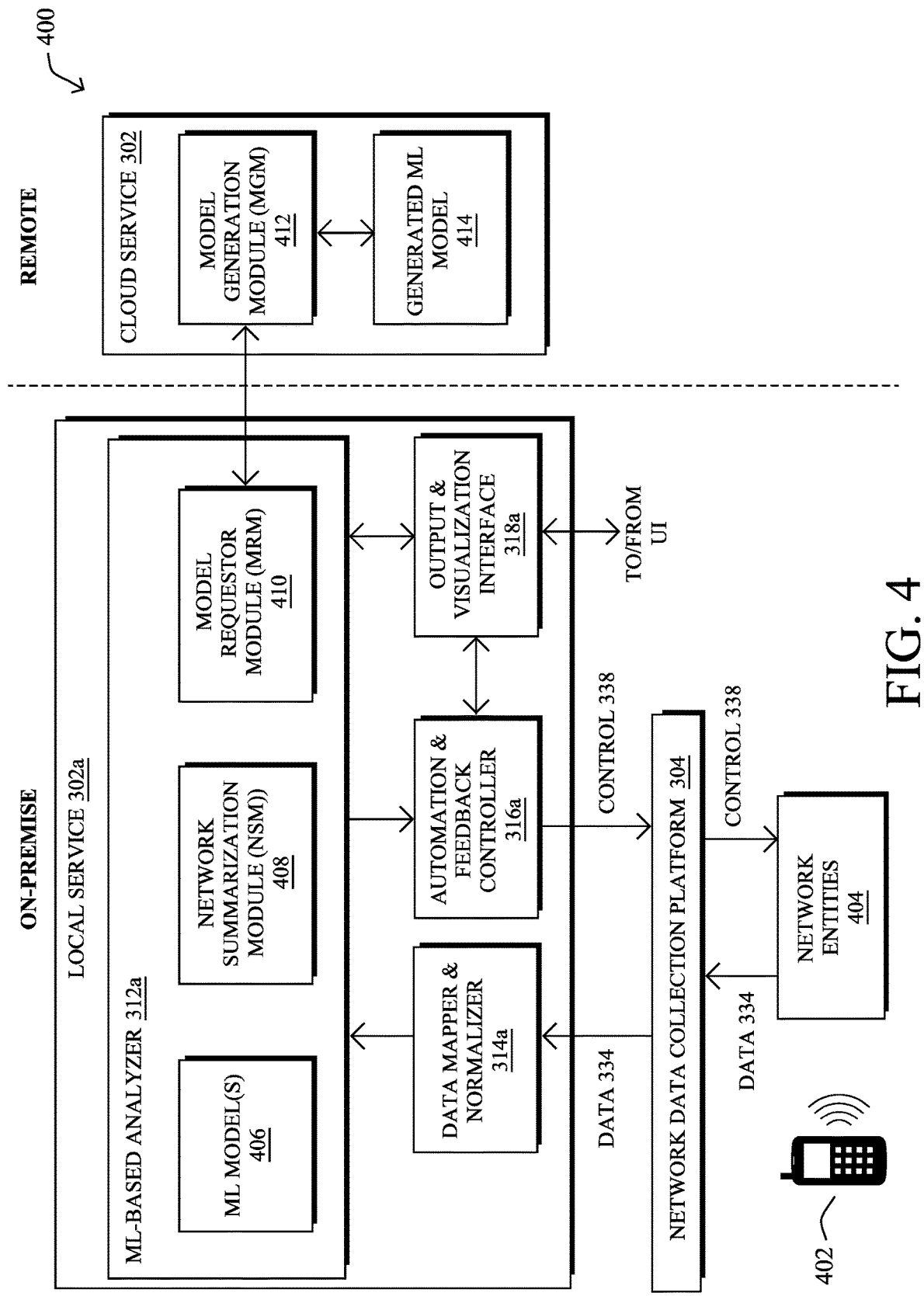
FIG. 4 illustrates an example architecture for privacy-aware model generation in a hybrid system.

Operationally, FIG. 4 illustrates an example architecture 400 for selecting a machine learning model for local deployment to a network, according to various embodiments. As shown, any or all of the components of network assurance system 300 may be implemented on-premise, as part of the local network to be monitored. For example, assume that the local network comprises any number of network elements/entities 404 that communicate with one or more client devices 402 within the monitored network itself. Network entities 404 may include, but are not limited to, radios, APs, WLCs, routers, switches, servers, or the like. On top of network entities 404 may be network data collection platform 304 that gathers measurements/telemetry data 334 from network entities 404, either directly on network entities 404 or on devices in communication therewith.

In various embodiments, a local service 302a may also be implemented on-premise in the local network, to assess the telemetry data 334 collected locally by network data collection platform 304. In general, local service 302a may include any or all of the components 312a-318a of cloud service 302 to perform the functions described above, locally within the monitored network. For example, local service 302a may be implemented on one or more devices of the local network, allowing service 302a to assess the collected telemetry data 334 locally using any number of machine learning-based models 406, and without having to send these measurements to the external cloud service 302 for assessment. In addition, in some cases, any alerts raised by local service 302a based on the outputs of model(s) 406 may be provided by output and visualization interface 318a to a user interface (UI) that is also on-premise, to further protect the data from the local network.

While local service 302a may not send certain network measurements externally, in some embodiments, local service 302a may still communicate with cloud service 302. For example, cloud service 302 may provide some degree of control over local service 302a, such as changing the configuration of local service 302a, adjusting the operation of local service 302a, or the like. In other words, in some cases, local service 302a may be seen as an extension of cloud service 302.

In various embodiments, local network assurance service 302a may include a network summarization module (NSM) 408 which executes on-premise and is responsible for surveying the telemetry data 334 produced by the network. During execution, NSM 408 evaluates each network entity 404 (e.g., radio/AP, AP controller, etc.) and/or client 402 of interest individually by collecting data of interest about them, such as telemetry data 334. Such data may range from high-level statistics (e.g., the daily or weekly average, min, max, etc.) regarding the traffic in the local network, the client count in the network, wireless association failures (e.g., DHCP failures, onboarding failures, etc.), to more fine-grained details, such as the distributions of application usages and device types. Further examples can even include more sensitive data pertaining to users in the network (e.g., user IDs, profiles, behavioral analytics, etc.). In turn, NSM 408 may summarize the collected data 334 into d-dimensional numerical vectors for each client 402 and/or entity 404 associated with the data 334. For example, the vector for a given AP/radio may indicate the number of clients 402 attached to the radio, traffic statistics (e.g., average bandwidth usage, etc.), the applications associated with the traffic (e.g., web traffic, video streaming, conferencing, etc.), and the like, each of which may be a separate dimension in the vector generated by NSM 408 for the radio.

Once NSM 408 has vectorized the measurements for the network entities 404 and/or clients 402 of interest, it may then create groups of entities by taking as input the d-dimensional vectors of each entity and applying a clustering approach (e.g., DB-scan, K-means, etc.). Typically, the number K of clusters is pre-defined by a configurable parameter (e.g., a configuration knob of the UI, etc.), but it may also be determined dynamically by NSM 408, in further embodiments.

Finally, NSM 408 may cluster every entity 404 (e.g., radios, AP controllers, etc.) and/or client 402 in the network and determine aggregate metrics for their d-dimensional vectors. For example, NSM 408 may average the vectors or compute other statistics for the set of vectors (e.g., medians, modes, percentiles, etc.). During this process, NSM 408 may also add noise to every dimension, so as to make every vector differentially private (e.g., the level of noise is a controllable variable of the differential privacy applied), in some embodiments. All of the K-number of vectors may then be summarized by NSM 408 into a K by (d+1) matrix, which is referred to herein as the "network summarization matrix." The additional column of the summarization matrix is used to capture the relative size of the different clusters.

Note that the various parameters of NSM 408, such as the clustering technique used, how the measurements are summarized, the level of noise added, etc., may either be imposed by cloud service 302 J (e.g., via a custom control message) or may be controlled on-premise via the UI. Pre-configuration may be used to "agree" on these parameters or a dynamic parameter negotiation mechanism may be used between cloud service 302 and the on-premise service 302a. Note that different on-premise implementations of service 302a may be using different techniques according to the level of required anonymization. In another embodiment, according to the level of required anonymization, different summarization techniques may be applied to different measurement variables, thereby leading to the use of not one summarized matrix but multiple matrices.

According to various embodiments, further components of architecture 400 may include a model requestor (MRM) 410 and a model generation model (MGM) 412). As shown, MRM 410 may be executed on-premise as part of local service 302a, while MGM 412 may be executed remotely, such as part of cloud service 302. During execution, MRM 410 may take as input the network summarization matrix produced by NSM 408 and push the matrix to cloud service 302. To this end, MRM 410 may send a custom machine learning model computation request, ReqModel, to MGM 412 in cloud service 302, that includes the network summarization matrix produced by NSM 408.

In general, MGM 412 is responsible for generating a synthetic training dataset based on the multi-customer or multi-network datasets available in cloud service 302, which follows the same distribution as dataset that is seen on-premise and reported via the summarization matrix in the model computation request. In other words, as cloud service 302 may monitor and assess the performance of any number of other networks than the one in which service 302a is located, cloud service 302 may leverage the measurements of those other network(s) to form a synthetic training dataset for model training. By leveraging the data available from one or more other networks, such a dataset will be more robust than one based on the measurements from the network of service 302a alone, leading to better model performance.

With respect to generating the synthetic training dataset for model training, the cluster information that the MGM 412 receives via the model computation request from MRM 410 allows MGM 412 to determine which subset of the multi-customer/network dataset is of interest, in order to compute a machine learning-based model 414 for deployment to local service 302a. In one embodiment, MGM 412 may maintain a database of pre-clustered measurements from the one or more other networks and choose the K-number of clusters that are closest to the clusters exposed by the network summarization matrix sent to MGM 412 by MRM 410. In another embodiment, MGM 412 will simply use all of the available samples in the K-number of selected clusters, in order to compute the custom model 414. However, this simple solution has some drawbacks, in that the sheer amount of data can be prohibitive or the number of samples in the selected clusters can be unbalanced. In other words, since more data could be available for a given cluster, the trained model 414 may be overfitting for a certain region of the sample space.

In further embodiments, MGM 412 may use more advanced sampling techniques to generate the synthetic training dataset used to train model 414. In some embodiments, MGM 412 may do so using a Kernel Density Estimator (KDE) technique. However, other techniques can also be used, in further implementations. For example, MGM 412 may also form the synthetic training dataset using Monte Carlo estimation, Markov chain Monte Carlo (MCMC) via Metropolis-Hasting algorithm-Gibbs sampling, or Diversity Based sampling.

In the case of KDE, MGM 412 may first estimate, for each of the K-number of aforementioned clusters, the probability density function using the multi-customer and/or multi-network measurement datasets available to cloud service 302. For example, MGM 412 can use a multivariate kernel density approach in which the goal of the multivariate kernel density estimation is to take a finite set of samples and infer the underlying probability distributions, hence giving the overall structure of data. By way of example, assume that there are N-number of samples $(x_1, x_2, \ldots, x_N)$ of dimension d for cluster $c_1$. In such a case, the kernel density estimator is given by:

$$\hat{f}_H(x) = \frac{1}{N} \sum_{i=0}^{N} K_H \cdot (x - x_i)$$

where $x_i$ is a d-dimension vector, K is the kernel function, and H the bandwidth. Example kernel functions that MGM 412 can use include the Gaussian kernel and spherical kernel. The bandwidth variable (H) controls the amount of smoothing. MGM 412 then uses the network summarization matrix to sample the large, multi-customer/multi-network dataset available to cloud service 302 using the kernel density function of each cluster defined previously, hence creating a tailored synthetic dataset that reflects as closely as possible the properties and the distribution of entities encapsulated by the network summarization matrix.

Using the synthetic training dataset formed by MGM 412 using any of the approaches detailed above, MGM 412 may generate/train a machine learning-based model 414 for execution by local service 302a. In turn, MGM 412 may send model 414 to MRM 410 and MRM 410 may install model 414 to the model(s) 406 used by local service 302a to analyze the performance of the on-premise network. In some cases, model 414 may replace an existing model 406, such as in the case where a default model 406 is used for a period of time. In further cases, model 414 may be used in addition to, or in lieu of, an existing model 406. For example, MRM 410 may monitor the performance of the installed model 414 and request further model training, if the performance is below a threshold amount.

Figure 5:
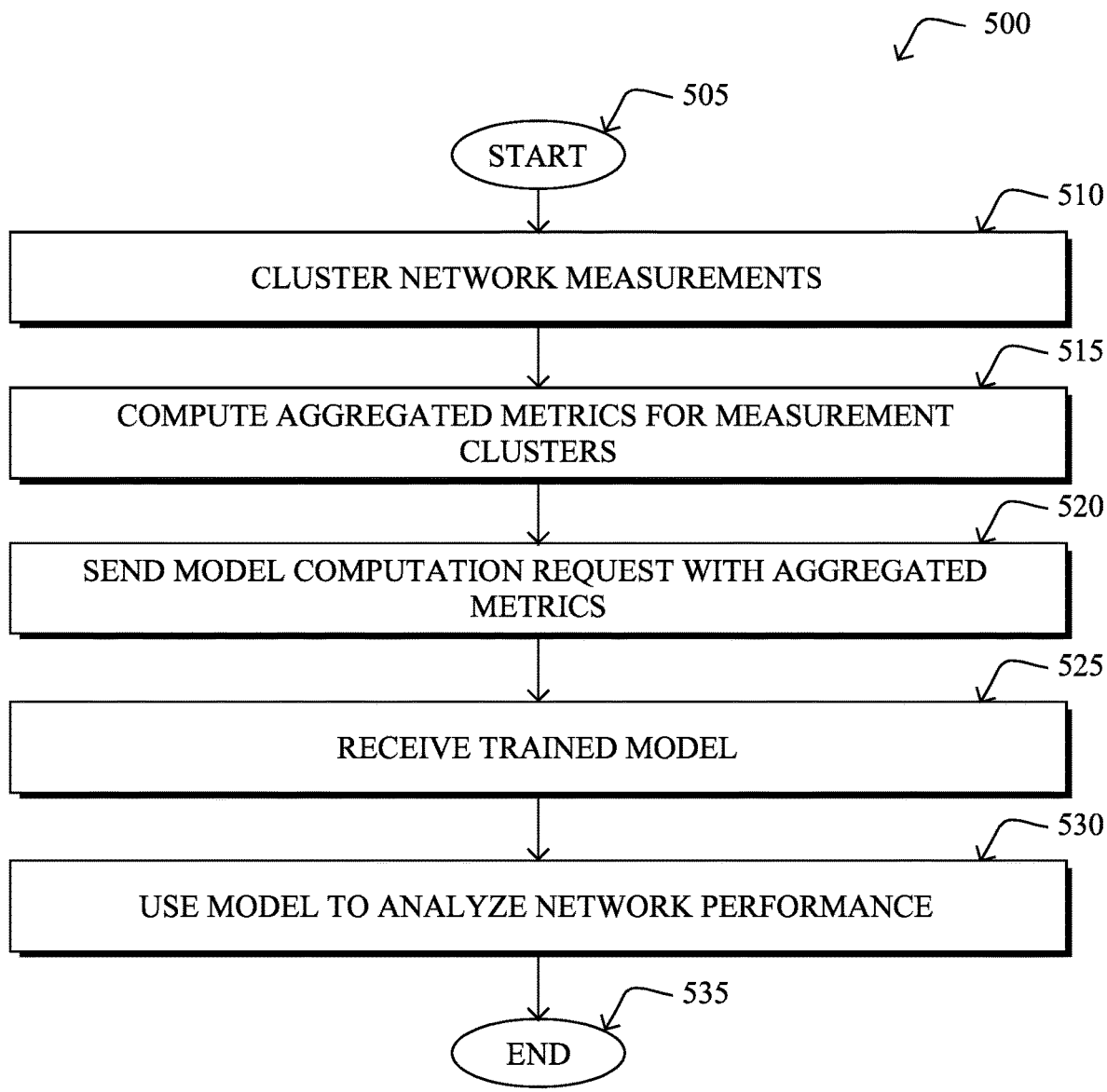
FIG. 5 illustrates an example simplified procedure for requesting model training from a remote service.

FIG. 5 illustrates an example simplified procedure for requesting model training from a remote service, in accordance with one or more embodiments described herein. For example, a non-generic, specifically configured device (e.g., device 200) may perform procedure 500 by executing stored instructions (e.g., process 248) to provide a network assurance service within a local network monitored by the service. The procedure 500 may start at step 505, and continues to step 510, where, as described in greater detail above, the network assurance service may cluster measurements obtained from the local network regarding a plurality of devices in the local network into measurement clusters. For example, the network assurance service may form vectors of measurements for each of the network entities and/or clients of interest and, in turn, cluster the vectors. Such measurements may include, but are not limited to, one or more statistics (e.g., average, min, max, percentiles, etc.) regarding traffic in the local network, client counts in the local network, or application usages in the local network.

At step 515, as detailed above, the network assurance service may compute aggregated metrics for each of the measurement clusters. In other words, for each of the measurement clusters, the network assurance service may summarize the measurement vectors in the cluster. For example, the network assurance service may average the vectors, or compute other statistics from the vectors in the cluster, to summarize the cluster. In some embodiments, such as when additional data privacy is desired, the network assurance service may add noise to the vectors during the summarization process. This can be done based on a policy and can even be applied on a differential basis (e.g., more noise is added to certain vectors or measurements, as desired). As a result of this summarization, the network assurance service may form a network summarization matrix of size d-by-K, where d is the number of measurements/dimensions per summarized vector and K is the number of clusters. In some embodiments, the service may also add another column to this summarization matrix, to signify the relative sizes of the different measurement clusters.

At step 520, the network assurance service may send a machine learning model computation request to a remote service outside of the local network that includes the aggregated metrics for each of the measurement clusters (e.g., the network summarization matrix computed in step 515), as described in greater detail above. Notably, while a model can be trained using only the measurements from the local/on-premise network, better model performance can be achieved by augmenting the local measurement information with measurements from one or more other networks. In turn, the remote service uses the aggregated metrics to train a machine learning-based model to analyze the local network. For example, the remote service may form a synthetic training dataset that combines the measurement summaries from the local network with measurements from one or more other networks, to train a machine learning-based model for deployment to the network assurance service in the local network.

At step 525, as detailed above, the network assurance service may receive the trained machine learning-based model from the remote service, to analyze performance of the local network. For example, the model may be sent via a custom model installation message to the network assurance service, indicating that the model is to be installed and executed by the network assurance service.

At step 530, the network assurance service may use the receive machine learning-based model to analyze performance of the local network. For example, if the model is an unsupervised learning-based anomaly detector, the model may indicate the normal or expected behaviors of the local network. When the measurements from the local network deviate from this model by a statistical amount (e.g., the difference exceeds a predefined threshold), this may indicate an unexpected or abnormal network behavior, which than then be used by the network assurance service to alert an administrator and/or initiate corrective measures. Procedure 500 then ends at step 535.

Figure 6:
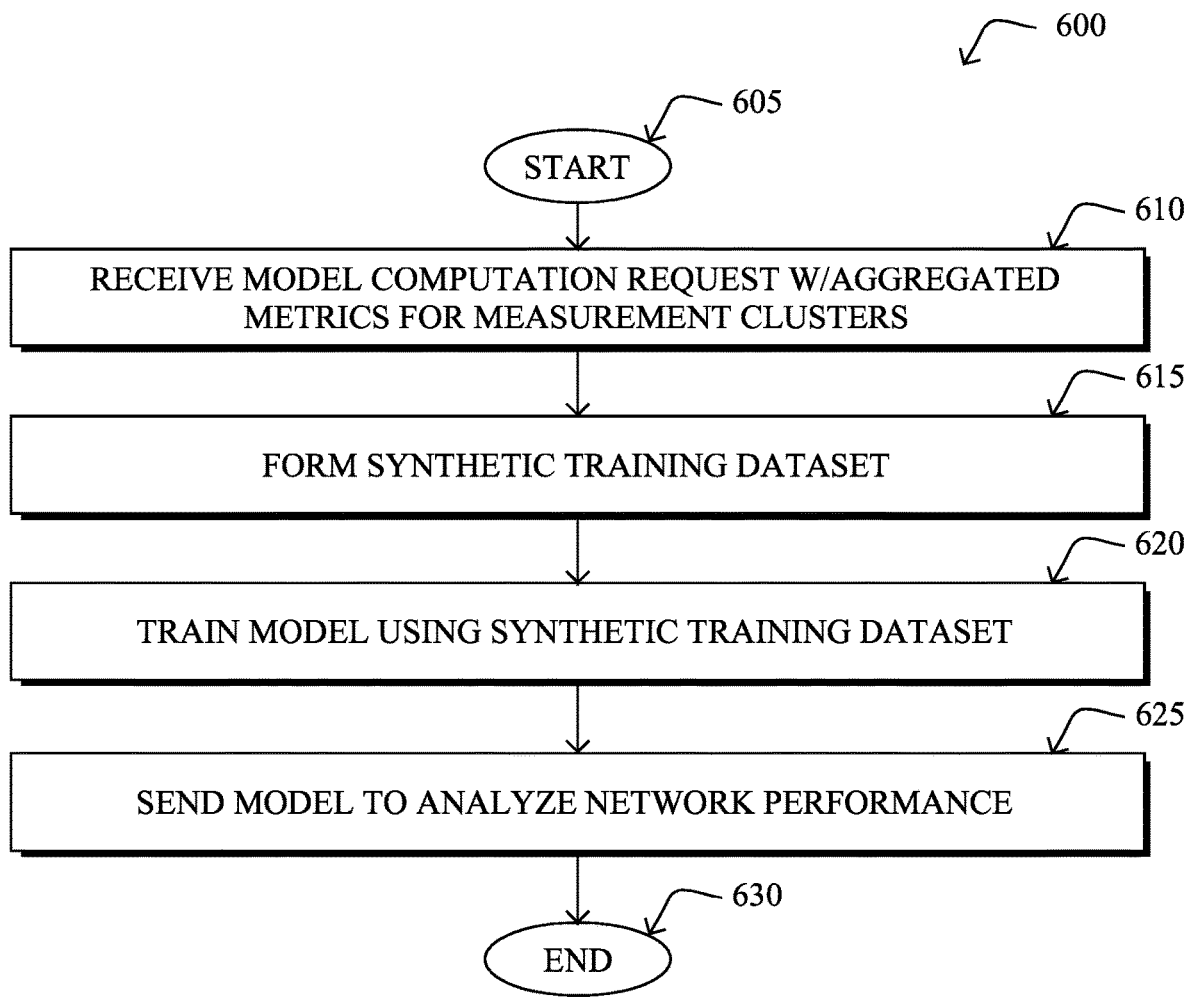
FIG. 6 illustrates an example simplified procedure for sending a trained model to a network assurance service in a local network.

FIG. 6 illustrates an example simplified procedure for sending a trained model to a network assurance service in a local network, in accordance with the teachings herein. For example, a non-generic, specifically configured device (e.g., device 200) may perform procedure 600 by executing stored instructions (e.g., process 248) to provide a remote (e.g., cloud-based) service that oversees a network assurance service located within a particular network. The procedure 600 may start at step 605, and continues to step 610, where, as described in greater detail above, the remote service may receive a machine learning model computation request from a network assurance service executing in a local network. In various embodiments, the model computation request may include aggregated metrics for clusters of measurements obtained by the network assurance service from the local network regarding a plurality of devices in the local network. For example, the model computation request may include a network summarization matrix, as detailed above, that summarizes the measurements obtained by the network assurance service regarding the local network in which the network assurance service resides.

At step 615, as detailed above, the remote service may form a synthetic training dataset for the model by combining the aggregated metrics from the model computation request with measurements associated with devices in one or more other networks. In one embodiment, the remote service may pre-cluster the measurement data from the one or more other networks and, in turn, select the pre-computed clusters that are closest to those of the model computation request. In further embodiments, the remote service may use a sampling approach, to generate the synthetic training dataset using the measurements from the one or more other networks. For example, the remote service may use a KDE-based approach, to form the synthetic training dataset. In some cases, the remote service may also insert noise into the data from the model computation request (e.g., if the network assurance service does not already do so).

At step 620, the remote service may train the machine learning-based model using the synthetic training dataset, as described in greater detail above. For example, the model may be an unsupervised-based anomaly detection model that models the expected/normal network behavior for the local network in which the network assurance service is located.

At step 625, as detailed above, the remote service may send the trained machine learning-based model to the network assurance service. In turn, the network assurance service uses the model to analyze performance of the local network. Procedure 600 then ends at step 630.

It should be noted that while certain steps within procedures 500-600 may be optional as described above, the steps shown in FIGS. 5-6 are merely examples for illustration, and certain other steps may be included or excluded as desired. Further, while a particular order of the steps is shown, this ordering is merely illustrative, and any suitable arrangement of the steps may be utilized without departing from the scope of the embodiments herein. Moreover, while procedures 500-600 are described separately, certain steps from each procedure may be incorporated into each other procedure, and the procedures are not meant to be mutually exclusive.

The techniques described herein, therefore, provide for a model training approach that allows a network assurance service in a local network to still leverage the benefits of cloud-based model training, while still protecting the privacy of the measurement data from the local network. Doing so provides for better model performance, as the model can be trained based on the measurements from the local network, as well as those from one or more other networks.

While there have been shown and described illustrative embodiments that provide for privacy-aware model generation in hybrid machine learning systems, it is to be understood that various other adaptations and modifications may be made within the spirit and scope of the embodiments herein. For example, while certain embodiments are described herein with respect to using certain models for purposes of anomaly detection, the models are not limited as such and may be used for other functions, in other embodiments. In addition, while certain protocols are shown, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. An apparatus, comprising:
one or more network interfaces;
a processor coupled to the network interfaces and configured to execute one or more processes; and
a memory configured to store a process executable by the processor, the process when executed configured to:
receive, as a remote service, a machine learning model computation request from a network assurance service executing in a local network, wherein the request includes aggregated metrics for clusters of measurements obtained by the network assurance service from the local network regarding a plurality of devices in the local network;
form, as the remote service, a synthetic training dataset for the model by combining the aggregated metrics from the model computation request with measurements associated with devices in one or more other networks, wherein the process is configured to form the synthetic training dataset by:
clustering the measurements associated with devices in the one or more other networks into a set of measurement clusters; and
selecting measurement clusters for use in the training dataset from among the set of measurement clusters that have aggregated metrics similar to the aggregated metrics in the model computation request;
train, by the remote service, the machine learning-based model using the synthetic training dataset; and
send, as the remote service, the trained machine learning-based model to the network assurance service, wherein the network assurance service uses the model to analyze performance of the local network,
wherein the measurement clusters are anonymized by adding noise to the measurement clusters and the aggregated metrics are computed for the anonymized measurement clusters.

2. The apparatus as in claim 1, wherein the process is configured to form the synthetic training dataset by:
sampling the measurements associated with the devices in the one or more other networks using a kernel density estimator, based on the aggregated metrics from the model computation request.

3. The apparatus as in claim 1, wherein the plurality of devices in the local network comprise one or more of: wireless access points, wireless access point controllers, or wireless client devices.

4. The apparatus as in claim 1, wherein the measurements obtained from the local network regarding the plurality of devices in the local network comprise one or more statistics regarding traffic in the local network, client counts in the local network, or application usages in the local network.

5. The apparatus as in claim 1, wherein the process is further configured to:

add noise to the aggregated metrics from the model computation request, prior to forming the synthetic training dataset.

6. A method comprising:

receiving, at a remote service, a machine learning model computation request from a network assurance service executing in a local network, wherein the request includes aggregated metrics for clusters of measurements obtained by the network assurance service from the local network regarding a plurality of devices in the local network;

forming, by the remote service, a synthetic training dataset for the model by combining the aggregated metrics from the model computation request with measurements associated with devices in one or more other networks, wherein forming the synthetic training dataset comprises:

clustering the measurements associated with devices in the one or more other networks into a set of measurement clusters; and selecting measurement clusters for use in the training dataset from among the set of measurement clusters that have aggregated metrics similar to the aggregated metrics in the model computation request;

training, by the remote service, the machine learning-based model using the synthetic training dataset; and sending, by the remote service, the trained machine learning-based model to the network assurance service, wherein the network assurance service uses the model to analyze performance of the local network, wherein the measurement clusters are anonymized by adding noise to the measurement clusters, and the aggregated metrics are computed for the anonymized measurement clusters.

7. The method as in claim 6, wherein forming the synthetic training dataset comprises:

sampling the measurements associated with the devices in the one or more other networks using a kernel density estimator, based on the aggregated metrics from the model computation request.

8. The method as in claim 6, wherein the plurality of devices in the local network comprise one or more of: wireless access points, wireless access point controllers, or wireless client devices.

9. The method as in claim 6, wherein the measurements obtained from the local network regarding the plurality of devices in the local network comprise one or more statistics regarding traffic in the local network, client counts in the local network, or application usages in the local network.

10. The method as in claim 6, further comprising:

adding, by the remote service, noise to the aggregated metrics from the model computation request, prior to forming the synthetic training dataset.

11. A tangible, non-transitory, computer-readable medium storing program instructions that cause a computer to execute a process comprising:

receiving, at a remote service, a machine learning model computation request from a network assurance service executing in a local network, wherein the request includes aggregated metrics for clusters of measurements obtained by the network assurance service from the local network regarding a plurality of devices in the local network;

forming, by the remote service, a synthetic training dataset for the model by combining the aggregated metrics from the model computation request with measurements associated with devices in one or more other networks, wherein forming the synthetic training dataset comprises:

clustering the measurements associated with devices in the one or more other networks into a set of measurement clusters; and selecting measurement clusters for use in the training dataset from among the set of measurement clusters that have aggregated metrics similar to the aggregated metrics in the model computation request;

training, by the remote service, the machine learning-based model using the synthetic training dataset; and sending, by the remote service, the trained machine learning-based model to the network assurance service, wherein the network assurance service uses the model to analyze performance of the local network, wherein the measurement clusters are anonymized by adding noise to the measurement clusters, and the aggregated metrics are computed for the anonymized measurement clusters.

12. The tangible, non-transitory, computer-readable medium as in claim 11, wherein forming the synthetic training dataset comprises:

sampling the measurements associated with the devices in the one or more other networks using a kernel density estimator, based on the aggregated metrics from the model computation request.

13. The tangible, non-transitory, computer-readable medium as in claim 11, wherein the plurality of devices in the local network comprise one or more of: wireless access points, wireless access point controllers, or wireless client devices.

14. The tangible, non-transitory, computer-readable medium as in claim 11, wherein the measurements obtained from the local network regarding the plurality of devices in the local network comprise one or more statistics regarding traffic in the local network, client counts in the local network, or application usages in the local network.

15. The tangible, non-transitory, computer-readable medium as in claim 11, further comprising:

adding, by the remote service, noise to the aggregated metrics from the model computation request, prior to forming the synthetic training dataset.

* * * * *